United States Patent Office 2,809,216
Patented Oct. 8, 1957

2,809,216

POLYENE ALDEHYDE AND ALCOHOLS

Hans Herloff Inhoffen, Braunschweig, Germany, and Otto Isler, Basel, and Paul Zeller, Neuallschwil, Switzerland, assignors to Hoffmann-La Roche Inc., Nutley, N. J., a corporation of New Jersey No Drawing. Application December 23, 1953, Serial No. 400,124

Claims priority, application Switzerland December 31, 1952

5 Claims. (Cl. 260—601)

The present invention concerns polyene compounds and a process for the manufacture thereof, which process comprises treating a 2,7-dimethyl-octa-2,6-dien-4-yne-1,8-diol with an oxidation agent, condensing the 2,7-dimethyl-octa-2,6-dien-4-yne-1,8-dial (hereinafter called C₁₀-dialdehyde) with a metal organic compound and hydrolyzing the condensation product formed.

The process according to the invention may be represented as follows.

```
HOH₂C—C=CH—C≡C—CH=C—CH₂OH
      |                    |
      CH₃                  CH₃           I

| 2O
              ↓

OHC—C=CH—C≡C—CH=C—CHO
    |                |
    CH₃              CH₃                 II

| 2RX
              ↓

XO                          OX
    |                           |
[ R—CH—C=CH—C≡C—CH=C—CH—R ]
      |                |
      CH₃              CH₃               III

| 2HOH
              ↓

HO                          OH
    |                           |
 R—CH—C=CH—C≡C—CH=C—CH—R
      |                |
      CH₃              CH₃               IV
```

RX=metal organic compound (as defined hereinafter).

The starting material I, i. e 2,7-dimethyl-octa-2,6-dien-4-yne-1,8-diol, may be prepared by aminotropic rearrangement of 2,7-dimethyl-octa-1,7-dien-4-yne-3,6-diol (condensed from α-methyl-acroleine and acetylene dimagnesium dibromide) in aqueous acetone by means of sulfuric acid; yield about 60 percent. The product crystallizes in benzene and melts at 108.5–109.5° C. Ultraviolet maxima at 272.5 mμ (ε=23,500) and 288 mμ (ε=18,830).

The oxidation of 2,7-dimethyl-octa-2,6-dien-4-yne-1,8-diol I is carried out by the action of high-valent metal oxides. The reaction is conducted in an organic solvent, such as acetone, ether, tetrahydrofuran or methylene chloride, at a temperature between 0° C. and the boiling point of the solvent used. Especially well suited as an oxidation agent is manganese dioxide, which is used at room temperature in dry acetone. If the oxidation is conducted in a large amount of acetone, in the presence of manganese dioxide in excess, the yield of C₁₀-dialdehyde II obtained is almost quantitative. The C₁₀-dialdehyde formed crystallizes in a mixture of petroleum ether and ether in yellowish needles melting at 68° C. Ultraviolet absorption maxima at 314 and 330 mμ. The C₁₀-dialdehyde is condensed with 2 equivalents of a metal organic compound RX, R standing for an organic radical and X for the term Me$^{II}$Hal or Me$^{I}$ (Me$^{II}$ or Me$^{I}$ represent di- or monovalent metals), especially MgHal, ZnHal or sodium and lithium. The condensation products III thus obtained are hydrolyzed by the action of water, weak acids or of ammonium salt solutions. The above operations lead to the formation of polyene compounds with two secondary hydroxy groups.

A particularly valuable mode of procedure of the above process is the condensation of the C₁₀-dialdehyde with 2 equivalents of a Grignard compound of the general formula R-MgBr, R standing for example for one of the radicals.

```
—CH₃      —C≡C—C=CH₂      —C≡C—C=CH—CH₂OMgBr
              |                  |
              CH₃                CH₃
```

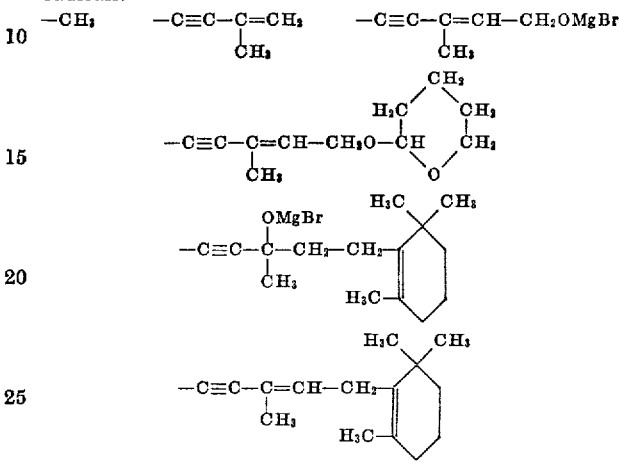

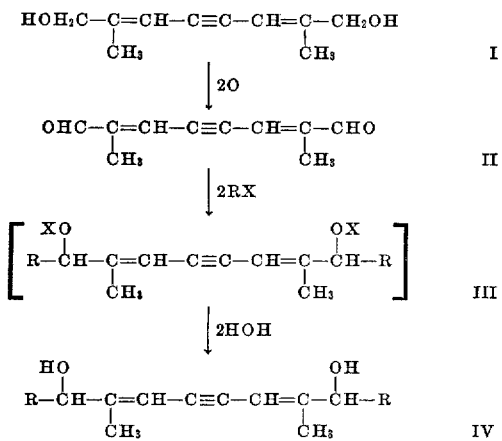

The said Grignard compounds may be prepared in the usual manner. Thus, methylmagnesium iodide is formed for example by reacting methyl iodide and magnesium in diethylether. The acetylene Grignard compounds may be produced preferably by reacting ethyl magnesium bromide with the acetylene compounds in diethyl ether. For each one of the active hydrogen atoms of the acetylene compounds, one molecule of the ethyl magnesium bromide is necessitated. The condensation of the Grignard compounds formed with the C₁₀-dialdehyde is performed in the usual organic solvents, such as for example diethyl ether or tetrahydrofurane. The acetylene compounds may in turn be prepared as follows:

Methylbutenyne is formed by condensing acetylene with acetone and by splitting off water from the condensation product.

1-hydroxy-3-methyl-pent-2-en-4-yne is formed by condensation of acetylene with methylvinylketone and subsequent allyl rearrangement by treatment with acid. Upon reacting the product formed with dihydropyrane in the presence of acid, the tetrahydropyranylether of 1-hydroxy-3-methyl-pent-2-en-4-yne is produced.

3-hydroxy - 3 - methyl-5-(2',6',6'-trimethyl-cyclohex-1'-en-yl)-pent-1-yne is prepared by reacting dihydro-β-ionone with acetylene in liquid ammonia by means of lithium acetylide. When water is split off from the said product, 3-methyl-5-(2',6',6'-trimethylcyclohex-1'-en-yl)-pent-3-en-1-yne is formed.

According to another mode of procedure of the present invention, the C₁₀-dialdehyde obtained by oxidation is condensed with 2 molecules of a lithium compound R'-Li, R' standing for the same radicals as above described for the Grignard condensation, preferably

```
—CH₃      —C≡CH      —C≡C—C=CH₂
                             |
                             CH₃
```

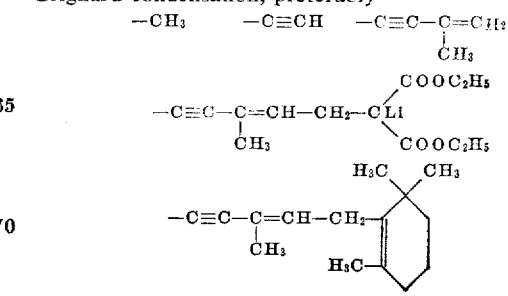

The preparation of the said lithium compounds is achieved in usual manner. For example methyllithium may be prepared from methyl iodide and lithium in diethyl ether. The lithium acetylide compounds are preferably prepared in liquid ammonia by reacting the acetylene compounds with lithium or lithium amide. For each one of the active hydrogen atoms of the acetylene compounds one molecule of lithium is required. The condensation of the lithium acetylene compounds formed with the $C_{10}$-dialdehyde is carried out preferably in liquid ammonia. The lithium condensation is the preferred manner of condensing the $C_{10}$-dialdehyde with acetylene and with 4-methylhex-3-en-5-yne-1,1-dicarboxylic acid diethylester. The latter is in turn prepared by reacting 1-bromo-3-methylpent-2-en-4-yne with sodium-malonic acid diethylester.

The condensation of the $C_{10}$-dialdehyde may be performed in an analogous manner also with the sodium compounds of the said acetylene compounds. It is preferred to operate in liquid ammonia. However, the sodium condensations lead to the formation of more side products and offer therefore no advantage over the lithium condensations.

According to an additional mode of procedure of the invention, the $C_{10}$-dialdehyde may be condensed with zinc compounds. The zinc condensations take in principle the same course as the Grignard reactions and the lithium condensations. The zinc condensations are particularly valuable in reacting the $C_{10}$-dialdehyde with α-bromoacetic acid ester and the vinylogs thereof, such as preferably the γ-bromotiglic acid ester. The latter is formed by heating the corresponding tiglic acid ester with 1.1 equivalent of N-bromosuccinimide in carbontetrachloride while exposing to light.

When subjecting the condensation product of $C_{10}$-dialdehyde and 2 equivalents of γ-bromotiglic acid ester to a dehydration procedure, the 8,8'-dehydro-crocetin-diester is formed, and by subsequent partial hydrogenation of the triple bond and by isomerisation of the hydrogenation products, the all-trans-crocetin-diester may be obtained.

The products of the present invention are valuable intermediates for the synthesis of natural coloring agents, such as more particularly β-carotene, bixin and crocetin.

EXAMPLE 1

Oxidation to $C_{10}$-dialdehyde 10 parts by weight of 2,7-dimethyl-2,6-octadien-4-yne-1,8-diol are dissolved in 1500 parts by volume of dry acetone; 150 parts by weight of manganese dioxide (prepared according to J. Chem. Soc. [1952], page 1094) are added and the mixture is mechanically shaken for 2 hours. The manganese dioxide is sucked off, washed with acetone until the filtrate runs off nearly colorless, whereupon the yellow acetone solution is concentrated in vacuo. Approx. 9.7 parts by weight of a solid, yellow residue, which is recrystallized from ether/petroleumether is obtained. The 2,7-dimethyl-2,6-octadien-4-yne-1,8-dial has the melting point 68° C. Ultraviolet maxima in ethanol at 314 mμ (ε=29,000) and 330 mμ (ε=26,200).

EXAMPLE 2

Condensation with methylmagnesium iodide

A solution of 1.9 parts by weight of $C_{10}$-dialdehyde in tetrahydrofurane is added dropwise to a Grignard solution (prepared from 0.9 part by weight of magnesium, 2.5 parts by volume of methyl iodide and ether) and stirring is continued at room temperature for 2 hours. Hydrolysis of the magnesium iodide salt formed by means of water, separating the ether layer and evaporating the solvent yields 2 parts by weight of a viscous residue, which is purified by recrystallization from benzene. Colorless crystals of melting point 90–93° C. are obtained. Ultraviolet maxima in ethanol at 273 mμ (ε=23,800) and 288 mμ (ε=20,000).

The condensation product IVa thus obtained

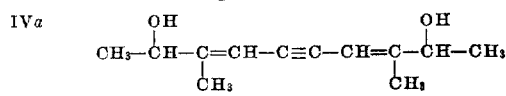

when oxidized with manganese dioxide yields 3,8-dimethyl-deca-3,7-dien-5-yne-2,9-dion of melting point 109–110° C. Ultraviolet maxima in ethanol at 234 mμ (ε=7,300) and 314 mμ (ε=27,300).

EXAMPLE 3

Condensation with methylbutenyne 7 parts by weight of methylbutenyne in 100 parts by volume of ether are added dropwise while cooling to an ether solution of ethylmagnesium bromide (prepared from 2.5 parts by weight of magnesium, 9 parts by volume of ethylbromide and 50 parts by volume of ether. The mixture is first stirred at room temperature for 30 minutes and then at 40° C. for 1 hour. The Grignard compound of the methylbutenyne is formed. After cooling down, a solution of 4.8 parts by weight of $C_{10}$-dialdehyde in 150 parts by volume of ether is added, and the mixture is refluxed for 1 hour. Working up as usual yields 8.1 parts by weight of a viscous oil of $n_D^{21}=1.5653$. The Zerewitinoff determination gives values corresponding to 1.96 mol of "active hydrogen." Ultraviolet maxima in ethanol at 223 mμ and 291 mμ.

The condensation product IVb thus obtained has the formula

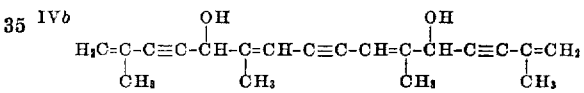

and may be converted into the crocetindialdehyde by partial hydrogenation of the triple bonds, allyl rearrangement of the secondary hydroxy groups and subsequent oxidation of the primary hydroxy groups formed.

EXAMPLE 4

Condensation with 1-hydroxy-3-methyl-pent-2-en-4-yne

An ethylmagnesium bromide solution is prepared from 6 parts by weight of magnesium, 21 parts by volume of ethyl bromide and 50 parts by volume of ether. A mixture of 12 parts by weight of 1-hydroxy-3-methyl-pent-2-en-4-yne and 200 parts by volume of tetrahydrofuran is added dropwise thereto and the clear Grignard solution is heated at 50° C. for 1 hour. After cooling down, a solution of 4.8 parts by weight of $C_{10}$-dialdehyde in 200 parts by volume of tetrahydrofuran is added and the mixture is stirred overnight at room temperature. When worked up in usual manner, the tetrahydroxy compound IVc of the formula

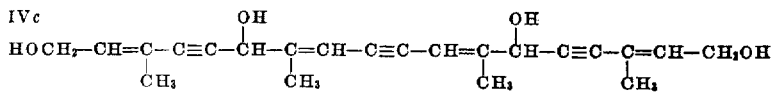

is obtained as a sirupy residue. Ultraviolet maxima in ethanol at 225 mμ, 278 mμ and 292 mμ.

EXAMPLE 5

Condensation with the pyranylether of 1-hydroxy-3-methyl-pent-2-en-4-yne

To a solution of ethylmagnesium bromide (prepared from 3 parts by weight of magnesium, 10 parts by volume of ethyl bromide, 50 parts by volume of ether and 100 parts by volume of tetrahydrofuran) is added a solution of 11 parts by weight of the pyranylether of 1-hydroxy-3-methyl-pent-2-en-4-yne (boiling point$_{0.1}$ 60–61° C., $n_D^{15}=1.4845$) in 50 parts by volume of tetrahydrofuran and the mixture is heated at 40–50° C. for 1 hour. After having cooled down, a solution of 2.4 parts by weight of C₁₀-dialdehyde in 100 parts by volume of tetrahydrofuran is added dropwise and stirred overnight at room temperature. The reaction mixture is poured into a solution of ammonium acetate in ice water and extracted with ether. The ether solution is washed with sodium hydrogen carbonate solution and water, dried with sodium sulfate and concentrated. The condensation product IVd of the formula sulfate and concentrated in vacuo. The condensation product thus obtained has the Formula IVf IVf
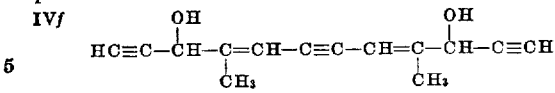

EXAMPLE 8

*Condensation with 4-methyl-hex-3-en-5-yne-1,1-dicarboxylic acid ethylester*

A solution of lithium in liquid ammonia is prepared

IVd
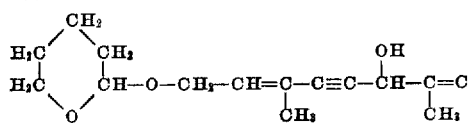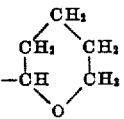

is a viscous oil. Ultraviolet maxima in ethanol at 225 mμ, 278 mμ and 292 mμ.

EXAMPLE 6

*Condensation with 3-hydroxy-3-methyl-5-(2',6',6'-trimethyl-cyclohex-1'-enyl)-pent-1-yne*

An ethylmagnesium bromide solution is prepared from 2.2 parts by weight of magnesium, 6.2 parts by volume of ethyl bromide and 100 parts by volume of absolute ether. 10 parts by weight of 3-hydroxy-3-methyl-5-(2',6',6'-trimethyl-cyclohex-1'-enyl)-pent-1-yne (boiling point₀.₀₂ 76–78° C., $n_D^{21}$=1.492) in 100 parts by volume and 2.4 parts by weight of 4-methyl-hex-3-en-5-yne-1,1-dicarboxylic acid ethylester (boiling point₁₂ 150° C., $n_D$=1.466) are added dropwise thereto. At the end, the blue color of the lithium disappears. Hereafter a solution of 0.84 part by weight of C₁₀-dialdehyde in absolute ether is added. After 1 hour, a small quantity of ammonium chloride is added and the solvent is evaporated. The residue is dissolved in ether, the solution is washed neutral, dried and evaporated. The remaining sirup is distributed between petroleum ether and 95 percent methanol. The methanolic fraction contains the condensation product IVg sought for:

IVg
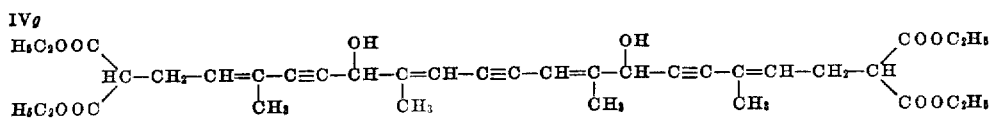

of ether are added thereto. The mixture is refluxed for 1 hour. After having cooled down, a solution of 3.3 parts by weight of C₁₀-dialdehyde in 300 parts by volume of ether is then added dropwise. The mixture is again refluxed for 3 hours. Working up as usual for Grignard condensations yields 14 g. of a sirupy residue of $n_D^{20}$=1.520. The Zerewitinoff determination gives values corresponding to 3.96 moles of "active hydrogen." Ultraviolet maxima in ethanol at 277 mμ and 292 mμ.

The condensation product IVe thus obtained has the formula

U. V. maxima in ethanol at 225 mμ, 278 mμ and 292 mμ.

EXAMPLE 9

*Condensation with γ-bromotiglic acid ester*

16.5 parts by weight of amalgamated zinc are covered with 10 parts by volume of tetrahydrofuran. 3.9 parts by weight of C₁₀-dialdehyde are separately dissolved in 25 parts by volume of tetrahydrofuran and 28 parts by volume of γ-bromotiglic acid methylester (boiling point₁₁ 90–92° C.) likewise in 20 parts by volume of tetrahy- IVe
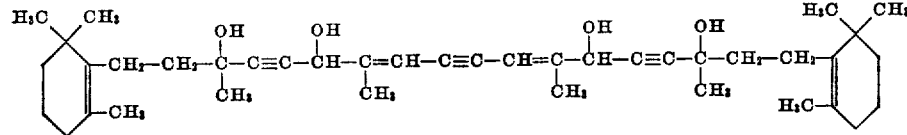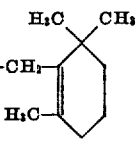

and possesses the carbon skeleton of β-carotene. Conversion into β-carotene may be effected by partial hydrogenation of the triple bonds, two allyl rearrangements and the splitting off of 4 moles of water.

EXAMPLE 7

*Condensation with lithiumacetylide*

1.6 parts by weight of C₁₀-dialdehyde are dissolved in 50 parts by volume of tetrahydrofuran and added dropwise to a solution of lithiumacetylide (from 0.5 part by weight of lithium) in liquid ammonia. After approx. 2 hours, 0.5 part by weight of ammonium chloride is added. Once the ammonia has evaporated, the mixture is taken up in ether, washed neutral, dried with sodium drofuran. To start the reaction, a small quantity of the γ-bromotiglic ester solution is added to the zinc and the mixture is heated until the solution boils up and becomes turbid. Then the C₁₀-dialdehyde solution and the γ-bromotiglic ester solution are added at such a rate, that the reaction mixture remains boiling actively. Once the addition of the reactants is complete, boiling is continued for one further hour. After cooling down, 250 parts by volume of 10 percent acetic acid are added and the mixture is extracted with benzene. The benzene extract is evaporated. The yellow oil remaining back has ultraviolet maxima at 277 mμ and 295 mμ. By distillation under a pressure of 0.01 mm. and at an air bath temperature of 160° C., the major part of the side product, which is formed by a Wurtz reaction of the γ-bromotiglic ester, can be removed. The residue of the distillation (11.7 parts by weight), which contains the condensation product IV*h* sought for of the formula IV*h*
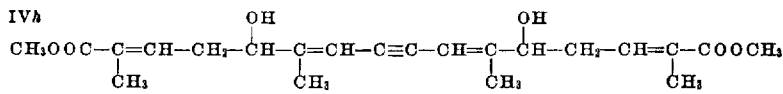

may be converted by splitting off water into the 8,8'-dehydrocrocetin-dimethylester and the latter in turn by subsequent partial hydrogenation and isomerisation into the trans-crocetindimethylester as follows:

The residue of the distillation is dissolved in 130 parts by volume of benzene and, for the purpose of splitting off water, boiled for 10 minutes with 2 parts by weight of solid p-toluenesulfonic acid, using a downward condenser. Thereafter, the p-toluenesulfonic acid is washed out from the reaction solution by means of sodium hydrogen carbonate solution. The solution is concentrated, filtered through an aluminumoxide column, rinsed with benzene, whereupon in order to remove low-boiling impurities the concentrated residue of the first filtrates is subjected anew to a high vacuo distillation. On cooling, the distillation residue crystallizes. Recrystallization from benzene/methanol yields 8,8'-dehydro-crocetin-dimethylester of melting point 167–167.5° C. showing the following ultraviolet maxima in petroleum ether 40–50° C.: 401.5 m$\mu$ ($\epsilon$=82,200) and 427 m$\mu$ ($\epsilon$=82,000).

The hydrogenation of 8,8'-dehydro-crocetin-dimethylester in highly purified benzene with 1 mol of hydrogen in the presence of palladium catalyst, the activity of which is reduced by means of lead (Helvetica Chimica Acta, volume 35, page 447), yields 8,8'-cis-crocetin-dimethylester of melting point 146° C. (non corrected), light, water and iodide being thoroughly excluded during the hydrogenation. Red needles from benzene/methanol. Ultraviolet maxima in petroleum ether 40–50° C.: 314 m$\mu$ ($\epsilon$=39,700), 397.5 m$\mu$ ($\epsilon$=60,500), 420 m$\mu$ ($\epsilon$=90,500) and 446 m$\mu$ ($\epsilon$=81,000). The isomerisation of said compound to the trans- or $\gamma$-crocetindimethylester may be effected, for example, in petroleum ether solution in the presence of iodine by exposure to light of a 500-watt-Philips-Foto-bulb. For purification purposes, the product is suitably chromatographed on an aluminumoxide column. Eluating the strongly adsorbing orange colored zone yields the trans-crocetin-dimethylester of melting point 213.5° C. (non-corrected) in the form of red, caterpillar-like crystal plates. Ultraviolet maxima in petroleum ether 40–50° C.: 315 m$\mu$ ($\epsilon$=6650), 399 m$\mu$ ($\epsilon$=81,000), 422 m$\mu$ ($\epsilon$=135,300) and 448 m$\mu$ ($\epsilon$=139,000).

We claim:
1. 2,7-dimethyl-octa-2,6-dien-4-yne-1,8-dial.
2. A compound of the general formula

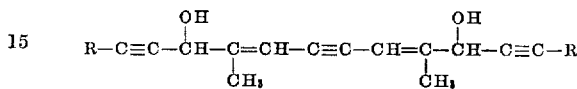

wherein R represents a member selected from the group consisting of hydrogen and lower aliphatic hydrocarbon radicals.

3. A compound according to claim 2 wherein R represents hydrogen.

4. A compound according to claim 2 wherein R represents the radical

5. A process of making a compound according to claim 2 which comprises condensing 2,7-dimethyl-octa-2,6-dien-4-yne-1,8-dial with two mols of a metal-organic compound R—C≡C—X, wherein R represents a member selected from the group consisting of hydrogen and lower aliphatic hydrocarbon radicals, and X represents a member selected from the group consisting of HalMg- and Li-, and hydrolyzing the condensation product obtained.

References Cited in the file of this patent
UNITED STATES PATENTS
2,609,396     Inhoffen et al. _____ Sept. 2, 1952

OTHER REFERENCES
Johnson: "The Chemistry of the Acetylenic Compounds," 1946, pages 290 and 307.
Karrer: "Organic Chemistry," 1946, page 79.
Heilbron et al.: J. Chem. Soc. 1943, 268–70.

UNITED STATES PATENT OFFICE
Certificate of Correction

Patent No. 2,809,216                                           October 8, 1957

Hans Herloff Inhoffen et al.

It is hereby certified that error appears in the printed specification of the above numbered patent requiring correction and that the said Letters Patent should read as corrected below.

Column 1, line 46, for "aminotropic" read —anionotropic—; column 6, line 23, for "$n_D$" read —$n_D^{22}$—.

Signed and sealed this 3rd day of December 1957.

[SEAL]

Attest:
KARL H. AXLINE,
*Attesting Officer,*

ROBERT C. WATSON,
*Commissioner of Patents.*